United States Patent [19]

Trinks et al.

[11] Patent Number: 5,384,385
[45] Date of Patent: Jan. 24, 1995

[54] TWO-COMPONENT POLYURETHANE REACTIVE COMPOSITIONS

[75] Inventors: Rainer Trinks, Dormagen; Otto Ganster, Odenthal; Heinrich Königshofen, Bergisch Gladbach, all of Germany

[73] Assignee: Bayer Aktiengesellschaft, Leverkusen, Germany

[21] Appl. No.: 976,078

[22] Filed: Nov. 13, 1992

[30] Foreign Application Priority Data

Nov. 21, 1991 [DE] Germany ............................. 4138246

[51] Int. Cl.⁶ .......................................... C08G 18/08
[52] U.S. Cl. ........................................ 528/52; 528/68; 528/76; 528/80; 528/85
[58] Field of Search ................. 528/44, 52, 68, 76, 528/80, 85

[56]            References Cited
          U.S. PATENT DOCUMENTS

| 3,274,160 | 9/1966  | Ellegast et al.      |             |
|-----------|---------|----------------------|-------------|
| 3,558,529 | 1/1971  | Whitman et al.       |             |
| 3,577,295 | 5/1971  | Kraft et al.         | 156/177     |
| 3,714,127 | 1/1973  | Fabris et al.        |             |
| 3,945,939 | 3/1976  | Barron               | 252/182     |
| 4,029,593 | 6/1977  | Schäpel et al.       | 252/182     |
| 4,141,952 | 2/1979  | Braun                | 264/251     |
| 4,156,064 | 5/1979  | Falkenstein et al.   | 528/46      |
| 4,273,884 | 6/1981  | Dominguez            | 521/114     |
| 4,336,298 | 6/1982  | Schwarz              | 428/285     |
| 4,385,133 | 5/1983  | Alberino et al.      | 521/159     |
| 4,436,841 | 3/1984  | Rasshofer et al.     | 521/106     |
| 4,485,032 | 11/1984 | Olstowski et al.     | 252/182     |
| 4,487,909 | 12/1984 | Coughlin et al.      | 528/60      |
| 4,518,521 | 5/1985  | Heusch et al.        | 258/188.031 |
| 4,554,340 | 11/1985 | Heusch et al.        | 528/77      |
| 4,562,289 | 12/1985 | Hajek et al.         | 528/44      |
| 4,568,717 | 2/1986  | Speranza et al.      | 524/762     |
| 4,575,518 | 3/1986  | Rasshofer et al.     | 521/51      |
| 4,576,731 | 3/1986  | Rieck                | 252/182     |
| 4,673,696 | 6/1987  | Tsai                 | 521/172     |
| 4,826,885 | 5/1989  | Tsai                 | 521/176     |
| 4,839,087 | 6/1989  | Tufts                | 252/182.27  |

FOREIGN PATENT DOCUMENTS

| 248254    | 12/1987 | European Pat. Off. . |
| 307987    | 3/1989  | European Pat. Off. . |
| 358427    | 3/1990  | European Pat. Off. . |
| 471474    | 2/1992  | European Pat. Off. . |
| 59-197416 | of 1984 | Japan .              |
| 985588    | 3/1965  | United Kingdom .     |

OTHER PUBLICATIONS

Database WPIL AN 91-188,945 & JP-A-3 115 421 (Asahi Glass) May 16, 1991.
Database WPIL AN 84-315379 & JP-A-59 197 416 (Daiichi) Nov. 9, 1984.

*Primary Examiner*—John Kight, III
*Assistant Examiner*—John M. Cooney, Jr.
*Attorney, Agent, or Firm*—Joseph C. Gil; Godfried R. Akorli

[57]            ABSTRACT

Disclosed herein are two-component polyurethane reactive compositions containing polyisocyanates and components carrying active hydrogen which are stabilized against separation with a compound in solution containing a NH group or $NH_2$ group and a C—N multiple bond or N—N multiple bond.

5 Claims, No Drawings

TWO-COMPONENT POLYURETHANE REACTIVE COMPOSITIONS

This invention relates to compatible, storage stable mixtures containing relatively high molecular weight polyhydroxyl compounds and short chain polyols and their use in the preparation of polyurethanes. The invention also relates to the use of these storage stable mixtures in two-component polyurethane adhesives.

It is known from DE-B-1,770,703 to use mixtures of incompatible polyols for the preparation of polyurethanes. The end products thereby obtained have improved properties, such as good heat resistance and high impact strength.

However, the use of mixtures of incompatible polyols has numerous disadvantages in the areas of storage and processing. When some mixtures of thoroughly mixed polyol components of this type are stored for only a brief period, i.e. a few hours to 3 days, said mixtures can separate into two phases. As such it is either necessary to intensively mix the phases, each time the polyol mixtures are filled into their containers or to mix continuously or circulate the components in order to ensure that the components will be maintained in the correct proportions in the mixtures.

Various methods have become known for stabilizing the phases of such mixtures. According to the teaching of U.S. Pat. No. 3,945,939, for example, separation of the phases may be prevented by the addition of colloidal silica or of a clay modified with an onium compound. DE-A 2,341,294 similarly teaches the use of inert, surface-active materials, such as a silica agglomerate and/or a chrysotile asbestos and/or an inorganic material resembling chrysotile asbestos in its mineral structure, having a specific surface area of from 10–800 $m^2/g$.

Another method of stabilizing the phases by homogenizing several incompatible polyols entails the use of liquid or soluble solubilizing agents. According to U.S. Pat. No. 4,141,952 mixtures of monomeric polyols having a molar mass below 500 and polyether polyols having a molar mass of from 1800 to 7000 are prevented from separating by using so-called graft polypropylene ether glycols having a molar mass of from 1500 to 3500.

According to U.S. Pat. No. 4,273,884 a stable emulsion of a high molecular weight polyol and ethylene glycol or butane-1,4-diol is prepared by adding thereto an ethylene oxide/propylene oxide copolymer (molar mass 12,000).

Mixtures of poly(oxypropylene/oxyethylene) polyols (OH number 20 to 60) having certain oxyethylene content, and ethylene glycol or butanediol are described in DE-B 2,759,398. The polyols used must have an oxyethylene end group content of from 10 to 30% by weight and an inner oxyethylene content of from 5 to 60% by weight. The polyols preferably contain as much ethylene oxide in their interior as possible.

According to U.S. Pat. No. 3,993,576 mixtures of high molecular weight polyoxyalkylene polyols having OH equivalent weights of from 650 to 3000 and the likes of ethylene glycol are prevented from separating by adding soluble diol compounds such as 1,2-butylene glycol, di-(1,2-butylene glycol), di-(1,2-propylene glycol) and tri-(1,2-propylene glycol).

It is also known that diphasic mixtures of incompatible polyols may be stabilized to remain monophasic by adding emulsifiers such as long chain benzene alkyl sulphonates, etc.

None of these state of the art teachings is entirely satisfactory. The use of solids as emulsion stabilizers are liable to cause abrasion of the dosing and mixing apparatus and the stabilizing effect generally decreases considerably after a few days. Moreover, there are physiological objections to introducing certain surface active substances such as asbestos materials. When using such surface-active substances, it is necessary to take into account their intrinsic catalytic activity, especially when onium compounds are used.

The use of so-called "graft polyols" proposed in U.S. Pat. No. 4,141,852 is disadvantageous in that these substances are expensive and therefore render the process less economical.

The teaching according to U.S. Pat. No. 4,273,884 also fails to satisfy the requirement for a monophasic, storage stable polyol mixture since the emulsions undergo at least partial phase separation within the first 6 to 8 weeks. The patent, incidentally, states that "fairly stable" emulsions are obtained.

Although U.S. Pat. No. 3,993,576 teaches that stable polyol mixtures which remain monophasic can be produced by the addition of di- and tripropylene glycol, it is well known to a person with ordinary skill in the art that the inclusion of such compounds causes a sharp deterioration in the mechanical properties of the polyurethane end products, in particular a loss in dimensional stability under heat.

The use of conventional emulsifiers for preserving the mixtures as a single phase has numerous disadvantages. The emulsifiers are liable to either crystallize from the polyol mixtures in the course of time or accumulate, e.g. on the surface, or they may alter the catalytic balance of the system in an uncontrollable manner and may bleed out of the polyurethane end products, thereby drastically reducing some of their properties.

There is also an urgent technical interest in sufficiently storage stable polyol or polyol-polyamine formulations which have a high hydroxyl number or hydroxyl/amine number in the mixture and may also contain a high proportion of, preferably, low molecular weight chain lengthening agents. DE-A 3,219,759 teaches that the compatibility of (i) relatively high molecular weight polyoxyalkylene polyols in the OH number range of from 20 to 210 containing at least 5% by weight of oxyethylene segments predominantly in end positions with (ii) ethylene glycol can be established by modifying the ethylene glycol with from 0.1 to 0.5 mol of propylene oxide per mol of ethylene glycol.

DE-A 3,219,822 (=EP-A-0,095,635) teaches that the effect of rendering compatible ethylene glycol (and/or 1,4-butanediol which is also used as example of a low molecular weight diol) by propoxylation may be enhanced by adding to the mixtures thereof certain ammonium or metal salts which are also used according to the invention.

EP-0,150,427 describes the use of potassium salts as enabling compounds for imparting compatibility. It proposes inter alia the addition product of potassium hydrogen sulphite to 2-cis-butenediol-(1,4) and subsequent reaction with propylene oxide as solubilizing agent.

U.S. Pat. No. 4,786,435 describes the use of phenols as enabling compounds for RIM systems.

U.S. Pat. No. 4,839,087 teaches the use of urethanes as enablers for RIM systems. U.S. Pat. No. 4,673,696 describes the use of unsaturated esterols such as fumaric acid or maleic acid esters as enablers. It also teaches their use in RIM systems. EP-A 0,341,375 describes the use of mixtures of polyoxypropylene triols in storage stable RIM systems. The mixtures may be free from polyoxyethylene in the polyether.

U.S. Pat. No. 4,385,133 describes compatible mixtures of glycols and propylene oxide/ethylene oxide polyols which require a high minimum proportion of ethylene oxide groups. The mixtures may be used in RIM systems. U.S. Pat. No. 4,319,973 describes polyurethane elastomers produced with the aid of storage stable mixtures of certain polymer polyols with glycols. This disclosure is only applicable to certain levels of ethylene oxide contents and certain compositions of the polymer polyols.

U.S. Pat. No. 4,576,731 describes mixtures of polyols which have been improved in their compatibility by their reaction with isocyanates.

Two-component polyurethane adhesives have long been known. Thus, U.S. Pat. No. 3,274,160 describes the reaction products of polyisocyanates with a mixture containing alcoholic hydroxyl functions. U.S. Pat. No. 3,591,561 and U.S. Pat. No. 3,725,355 describe the preparation of polyurethane elastomers. In the former, a lactone polyester polyol and a low molecular weight diol are reacted with an organic diisocyanate and cross-linked by means of a diamine or polyol such as glycerol. In the latter, the polyurethane elastomer is produced from a polyether polyol, a chain lengthening agent and an isocyanate prepolymer, using a tin catalyst. U.S. Pat. No. 3,577,295 describes polyurethane elastomers for drive belts, using polyol mixtures containing polymers of unsaturated monomers, organic polyisocyanates and amines as hardeners. Polyurethanes obtained from polyester polyol prepolymers which are mixed with low molecular weight polyols and reacted with diisocyanates are described in U.S. Pat. No. 4,182,898. U.S. Pat. No. 4,93,832 describes the reaction of polyisocyanate with isocyanate reactive hydrogen, in which tertiary amines may function as catalysts. A method of preparation of polyurethane adhesives using excess diisocyanates, polyols and optionally chain lengthening agents such as amines is described in U.S. Pat. No. 4,156,64. The use of amines to impart non-sagging characteristics to adhesives is particularly described in U.S. Pat. Nos. 3,979,364, 4,336,298 and 4,444,976 and in EP-A-63,534.

U.S. Pat. No. 4,487,909 describes an adhesive based on a polyol, e.g. a polyether polyol and glycerol as branching agent. U.S. Pat. No. 4,530,941 describes a reaction injection (RIM) polyurethane mixture composed of a high molecular weight polyol, a chain lengthening agent, a polyoxyalkylene carrying amino end groups and a polyisocyanate. U.S. Pat. No. 4,554,340 describes a polyol mixture for the preparation of polyurethanes from high molecular weight polyalkylene oxides and low molecular weight diols and optionally also isocyanate reactive compounds such as glycerol and diamine. U.S. Pat. No. 4,568,717 describes the preparation of polyols from organic polyisocyanates with a terephthalic acid polyester polyol.

U.S. Pat. No. 3,714,127 describes two-component polyurethane adhesives based on an isocyanate prepolymer to which an amine is added for increasing the viscosity and ensuring the non-sagging character of the adhesive.

EP 0,068,209 describes a two-component polyurethane adhesive having a polyol component containing a polyester triol or polyether triol, a phenylene diamine and a tin catalyst. This mixture is reacted with an aromatic diisocyanate.

EP 248,254 describes a two-component polyurethane adhesive which is the reaction product of a hydroxyl functional component, a di- or triamine and an organic isocyanate. The adhesives thus produced are distinguished by excellent properties but do not as yet satisfy all requirements of stability during storage of the hydroxy functional polyol component.

The use of dicyandiamide (=dicy, cyanoguanidine) or heterocyclic nitrogen compounds as hardeners for epoxide resins is known, see e.g. A. R. Meath "Epoxy Resins" in "Handbook of Adhesives", third edition, published by I. Skeist.

The use of dicy as flame retardant in the preparation of polyurethanes is claimed in EP-A-0,358,427. The dicy is present in the polyether as a dispersed solid.

It cannot be concluded from these applications of dicy and compounds of similar structure known in the art that they have a solubilizing action on mixtures of low molecular weight polyhydric alcohols with relatively high molecular weight polyols. On the contrary, in view of the low solubility of dicy in relatively high molecular weight polyether polyols and polyepoxides, this observation must be regarded as distinctly surprising.

It was therefore an object of the present invention to provide components which contain active hydrogen and are stabilized against separation and constitute efficient two-component polyurethane reactive compositions after they have been mixed with polyisocyanates. Another object of the invention was to provide efficient two-component polyurethane reaction adhesives.

SUMMARY OF THE INVENTION

This invention relates to a two-component polyurethane reactive composition containing an isocyanate component a), a component b) containing active hydrogen, which component is stabilized against separation, and optionally containing catalysts for the reaction of a) with b) and optionally other auxiliary agents and additives, characterized in that component b) containing active hydrogen contains, in solution, at least one compound which stabilizes against separation selected from the group consisting of dicyandiamide, guanidine, derivatives of guanidine, containing at least one N—H-bond and compounds having a NH group or $NH_2$ group and a C—N multiple bond or N—N multiple bond, in which the nitrogen atom of the C—N group or a nitrogen atom of the N—N group is directly connected to the nitrogen atom of the NH group or $NH_2$ group.

In one particular embodiment, component b) contains:

b1) 100 parts by weight of a hydroxyl group-containing compound having a molecular weight of at least 400 and a hydroxyl functionality of at least 2, b2) from 5–35 parts by weight of a hydroxyl group-containing low molecular weight chain lengthening agent having a molecular weight of at least 62 and a hydroxyl functionality of at least 2, b3) from 0.5–10 parts by weight of a compound in solution which stabilizes against the separation of b1) and b2) of the type mentioned hereinbefore, and b4) from 0 to 20 parts by weight of an aliphatic, aromatic or cycloaliphatic diamine or triamine having a molecular weight of at least 60.

Mixtures of stabilizing compounds may also be used according to the invention.

The reactive compositions according to the invention may be used for the production of shaped or unformed polyurethanes. The polyurethanes may also be foamed.

In a preferred embodiment, components a) and/or b) also contain conventional auxiliary agents and additives.

DETAILED DESCRIPTION OF THE INVENTION

The compounds corresponding to the following formula are particularly suitable as isocyanate components:

$$Q(NCO)_n,$$

wherein n=2-4, preferably 2, and Q denotes an aliphatic hydrocarbon group having 2-18, preferably 6-10 carbon atoms, a cycloaliphatic hydrocarbon group having 4-15, preferably 5-10 carbon atoms, an aromatic hydrocarbon group having 6-15, preferably 6-13 carbon atoms, or an araliphatic hydrocarbon group having 8-15, preferably 8-13 carbon atoms.

The following polyisocyanates are particularly preferred: hexamethylenediisocyanate, 1,12-dodecanediisocyanate, cyclobutane-1,3-diisocyanate, cyclohexane-1,3- and -1,4-diisocyanate and any mixtures of these isomers, 1-isocyanato-3,3,5-trimethyl-5-isocyanato-methylcyclohexane, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and any mixtures of these isomers, diphenylmethane-2,4'- and/or 4,4'-diisocyanate, naphthylene-1,5-diisocyanate, triphenylmethane-4,4'4''-tri-isocyanate and polyphenyl-polymethylene polyisocyanates obtainable by aniline/-formaldehyde condensation followed by phosgenation.

There can also be employed relatively high molecular weight polyisocyanates which can be modification products of such simple polyisocyanates. Examples thereof can be polyisocyanates containing isocyanurate, carbodiimide, allophanate, biuret or uretdione structural units as obtainable by processes known in the art from the simple polyisocyanates of the above general formula mentioned above. Among the relatively high molecular weight modified polyisocyanates, the prepolymers with isocyanate end groups in the molecular weight range of from 400 to 10,000, preferably from 600 to 8,000, in particular from 800 to 5,000 known from polyurethane chemistry are of particular interest. These compounds are prepared in known manner by the reaction of excess quantities of simple polyisocyanates of the type exemplified above with organic compounds having at least two isocyanate reactive groups, in particular organic polyhydroxyl compounds. Suitable polyhydroxyl compounds of this type include both simple polyhydric alcohols in the molecular weight range of from 62 to 599, preferably from 62 to 200, e.g. ethylene glycol, trimethylolpropane, propane-1,2-diol, butane-1,4-diol or butane-2,3-diol. Particularly suitable are relatively high molecular weight polyether polyols and/or polyester polyols of the type known per se from polyurethane chemistry which have molecular weights of from 600 to 8000, preferably from 800 to 4000, and contain at least 2, generally 2 to 8, preferably 2 to 4 primary and/or secondary hydroxyl groups. Isocyanate prepolymers obtained, for example, from low molecular weight polyisocyanates of the type exemplified above and less preferred compounds containing isocyanate reactive groups, e.g. polythioether polyols, polyacetals containing hydroxyl groups, polyhydroxy-polycarbonates, polyester amides containing hydroxyl groups or hydroxyl group-containing copolymers of olefinically unsaturated compounds may, of course, also be used. Compounds with isocyanate reactive groups suitable for preparing the isocyanate prepolymers, in particular compounds containing hydroxyl groups, include, for example, the compounds disclosed by way of example in U.S. Pat. No. 4,218,543, column 7, line 29 to column 9, line 25. For the preparation of the isocyanate prepolymers, these compounds containing isocyanate reactive groups are reacted with simple polyisocyanates of the type exemplified above in proportions corresponding to an NCO/OH equivalent ratio of about 1.5:1 to 20:1, preferably from 5:1 to 15:1. The isocyanate prepolymers generally have an isocyanate content of from 2.5 to 25, preferably from 6 to 22% by weight. It is clear from this that the terms "isocyanate prepolymers" and "prepolymers with isocyanate end groups" used in the context of this invention include both the reaction products as such and their mixtures with excess quantities of unreacted starting polyisocyanates, which are frequently also referred to as "semiprepolymers".

Polyisocyanate components a1) which are particularly preferred for the process according to the invention include the usual commercial polyisocyanates used in polyurethane chemistry, i.e. hexamethylene diisocyanate, 1-isocyanato-3,3,5-trimethyl-5-isocyanatomethyl-cyclohexane (isophorone diisocyanate, abbreviated: IPDI), 4,4'-diisocyanato-dicyclohexylmethane, 2,4-diisocyanatotoluene, its commercial mixtures with 2,6-diisocyanatotoluene, 4,4'-diisocyanatodiphenylmethane, mixtures thereof with the corresponding 2,4'- and 2,2'-isomers, polyisocyanate mixtures of the diphenylmethane series which are obtainable in known manner by the phosgenation of aniline/formaldehyde condensates, biuret or isocyanurate group-containing modification products of these commercial polyisocyanates and in particular isocyanate prepolymers of the type mentioned above based on these commercial polyisocyanates on the one hand and the simple polyols and/or polyether polyols and/or polyester polyols exemplified above on the other hand, and any mixtures of such polyisocyanates.

Component b1) of the system according to the invention consists essentially of at least one organic compound having a molecular weight of from 400 to 12,000, preferably from 400 to 6,000, containing 2 to 8, preferably 2 to 5, hydroxyl functional groups. The molecular weights given here may be calculated from the OH number of the substance in accordance with the following equation:

$$\text{Molecular weight} = \frac{56,000}{OH\ number} \times \text{functionality}.$$

Suitable examples include the polyhydroxy polyethers known per se from polyurethane chemistry which are obtainable by the alkoxylation of suitable starter molecules such as ethylene glycol, diethylene glycol, 1,4-dihydroxybutane, 1,6-dihydroxyhexane, trimethylolpropane, glycerol, pentaerythritol, sorbitol or sucrose. The following may also function as starters: Ammonia or amines such as ethylene diamine, hexamethylene diamine, 2,4-diaminotoluene, aniline and amino alcohols. Alkoxylation is carried out with propylene oxide and/or ethylene oxide in any sequence.

Polyester polyols obtainable in known manner by reaction of the low molecular weight hydroxyl functional compounds exemplified above with polybasic carboxylic acids such as adipic acid, phthalic acid, hexahydrophthalic acid, tetrahydrophthalic acid or anhydrides of these acids are also suitable.

Relatively high molecular weight polyhydroxypolyethers containing high molecular weight polyadducts or polycondensates or polymers in a finely dispersed, dissolved or grafted form are also suitable. Such modified polyhydroxyl compounds may be obtained, for example, by carrying out polyaddition reactions (e.g. reactions between polyisocyanates and aminofunctional compounds) or polycondensation reactions (e.g. between formaldehyde and phenols and/or amines) in situ in the compounds containing hydroxyl groups. Processes of this type are described, for example, in DE-AS 1,168,075 and 1,260,142, DE-A-2,324,134, 2,423,984, 2,512,385, 2,513,815, 2,550,796, 2,550,833, 2,550,862, 2,633,293 and 2,639,254. Such modified hydroxyl compounds may also be prepared according to U.S. Pat. No. 3,869,413 or DEA 2,550,860 by mixing a previously prepared aqueous polymer dispersion with a polyhydroxyl compound and then removing the water from the mixture.

Polyhydroxyl compounds modified by vinyl polymers as obtainable, for example, by the polymerization of styrene and acrylonitrile in the presence of [polyethers (U.S. Pat. Nos. 3,383,351, 3,304,273, 3,523,093, 3,110,695; DE-A-1,152,536) or polycarbonate polyols (DE-PS 1,769,795; U.S. Pat. No. 3,637,909) are also suitable as component b) for the process according to the invention. When polyether polyols are used which have been modified according to DE-A-2,442,101, 2,644,922 and 2,646,141 by graft polymerization with vinyl phosphonic acid esters and optionally (meth)-acrylonitrile, (meth)acrylamide or OH functional (meth)-acrylic acid esters, the synthetic resins obtained have exceptional flame resistance.

Representatives of the above-mentioned compounds to be used as compounds b1) according to the invention are described, for example, in High Polymers, Volume XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on page 45–71.

Preferred polyols b2) include low molecular weight polyhydric alcohols in the molecular weight range of from 62–400 containing 2 to 8 and preferably 2 functional groups, already mentioned as starter molecules under b1). Examples thereof can be ethylene glycol, diethylene glycol, 1,4-dihydroxy-butane, butane-2,3-diol, 1,6-dihydroxyhexane, trimethylolpropane, glycerol, pentaerythritol, sorbitol or saccharose. Polyhydric alcohols having a functionality of 2 are particularly preferred.

According to the invention, component b1) preferably consists essentially of the an organic compound having a molecular weight of from 400 to 12000, preferably from 400 to 6000, containing 2 to 8, preferably 2 to 5, hydroxyl functional groups. Preferred polyols b2) include low molecular weight polyhydric alcohols in the molecular weight range of from 62–400 already mentioned as starter molecules under b1), e.g., ethylene glycol, diethylene glycol, 1,4-dihydroxy-butane, butane-2,3-diol, 1,6-dihydroxy-hexane, trimethylol-propane, glycerol, pentaerythritol, sorbitol or sucrose. Polyhydric alcohols having a functionality of 2 are particularly preferred.

Suitable compounds b3) which prevent separation of the components b1) and b2) are, for example, dicyandiamide, guanidine or guanidine derivatives as [2,2,2-trichloro-acetimidoyl]-guanidine, ethoxycarbimidoyl guanidine, biguanide, o-tolylbiguanide, N-cyano-N'-methoxymethyl-guanidine, N-acetyl-N'-cyano-guanidine, N-cyano-N'-propionyl guanidine, N-acryloyl-N'-cyanoguanidine, N-cyano-N'-methoxycarbonyl-guanidine, N,N'-dicyanoguanidine, tri-guanide, N,N'-dicyano-N-methoxycarbonylguanidine, 1-methoxybiguanide, 2-guanidinobenzimidazole, 2-guanidino-5-nitrobenz-imidazole and 2-cyanaminobenzimidazole.

Tautomers and/or salt-type complexes of many of these compounds are known but these complexes are not preferred. Representatives of the above-mentioned compounds to be used according to the invention as stabilizers against separation are described in Beilstein's Handbuch der Organischen Chemie, Volume E IV 3, pages 148 to 172. Dicyandiamide is preferred.

Pyrazole as well as 1,2,4-triazole are typical examples of compounds in which the nitrogen atom of the C—N group is linked to the nitrogen atom of the N—H or NH Pyrazole and 3,5-dimethylpyrazole are particularly preferred.

Typical examples of compounds in which a nitrogen atom of the N—N group is linked to the nitrogen atom of the NH or $NH_2$ group include triazole and its derivatives such as benzotriazole, 4-methylbenzo-triazole and 5-methyl -benzotriazole.

Benzotriazole, 4-methylbenzotriazole, 5-methylbenzotriazole and isomeric mixtures thereof (tolyl triazole) are particularly preferred among the last-mentioned type of suitable compounds.

The most preferred additives b3) are dicyandiamide, guanidine and the above-mentioned derivatives of guanidine.

The compounds b3) in accordance with the invention which stabilize against separation are dissolved in component b). Component b) preferably contains from 1 to 10% by weight of these stabilizing compounds.

The amines b4) have a molecular weight from 60 to 300. Particularly preferred among these amines are diamines such as 1,4-diaminobenzene, 2,4-diaminotoluene, 2,4'- and/or 4,4'-diaminodiphenylmethane and especially diamines which have an alkyl substituent in an ortho-position to the amino groups, in particular those which have at least one alkyl substituent in the ortho-position to the first amino groups and two alkyl substituents, each with 1 to 3 carbon atoms, in the ortho-position to the second amino group. Particularly preferred are those which have an ethyl, n-propyl and/or isopropyl substituent in at least one ortho-position to the amino groups and optionally methyl substituents in other ortho-positions to the amino groups. The following are examples of these preferred or particularly preferred diamines: 2,4-Diaminomesitylene, 1,3,5-triethyl-2,4-diaminobenzene, 1,3,5-triisopropyl-2,4-diaminobenzene, 1-methyl-3,5-diethyl-2,4-diaminobenzene, commercial mixtures thereof with 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane and 3,5-diethyl-3',5'-diisopropyl-4,4'-diaminodiphenylmethane. Any mixtures of such aromatic diamines may also be used.

Isophorone diamine, bis-(4-aminocyclohexyl)-methane, 1,4-diaminocyclohexane, ethylene diamine and its homologues and piperazine are particularly preferred aliphatic diamines.

The compositions of the invention may contain conventional auxiliary agents and additives such as catalysts, blowing agents, foam stabilizers, fillers, dyes, drying agents (zeolites and/or pigments).

Further details concerning conventional auxiliary agents and additives may be found in the technical literature, for example in the monograph by J. H. Saunders and K. C. Frisch entitled "High Polymers", Volume XVI, Polyurethanes, Parts 2 and 7, Interscience Publishers, 1962 and 1964.

The present invention also relates to the use of the two-component polyurethanes of the invention as adhesives in a process for bonding substances by means of say gluing them with the system according to the invention. The system according to the invention is suitable in particular for gluing synthetic resins, metals, stone, wood and glass.

The two-component polyurethane adhesive is preferably used by continuously mixing the two components a) and b) either in a stirrer mixer or in a static mixer or a counterflow mixer and immediately applying the finished adhesive as a strand to at least one of the substrates to be joined. A preliminary treatment of the substrate surfaces by cleaning, roughening or the like is frequently unnecessary. The quantitative ratios of isocyanate component to polyol component follow the general principles of isocyanate chemistry; a slight excess of isocyanate is employed (Index range 100–125, preferably from 100–115).

The substrates can be bonded by applying to a surface of one of the substrates and contacting said surface with a surface of another substrate to which the system is optionally applied. The substrates to which adhesives have been applied are placed together, fixed and either left to harden at room temperature or subjected to a hardening process at an elevated temperature. The degree of hardness at which separation by hand is no longer possible can be reached more rapidly at an elevated temperature than at room temperature.

The desired open time or hardening time may be varied within wide limits by the choice of hardening temperature and choice of catalyst.

Another advantage of the adhesive according to the invention is that it can be processed solvent-free.

The invention is further illustrated but is not intended to be limited by the following examples in which all parts and percentages are by weight unless otherwise specified.

EXAMPLES

Catalyst

Cat. 1=tert. amine catalyst having the following structure

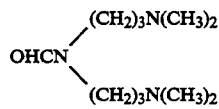

Cat. 2=tert. amine catalyst Dabco 33 LV from Air Products Company

Zeolite paste

A 50% zeolite suspension in castor oil.

H12-MDA: Aliphatic diamine having the following structure

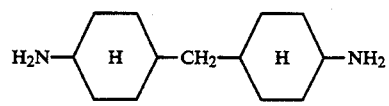

IPDA: Isophorone diamine
DC: Dicyandiamide (=cyanoguanidine)
GB: 2-Guanidinobenzimidazole
PY: Pyrazole
DP: 3,5-Dimethylpyrazole
BT: Benzotriazole
TT: Tolyl triazole Crude MDI: 4,4'-Diisocyanatodiphenylmethane mixed with its isomers and higher homologues as obtained by the phosgenation of aniline/formaldehyde condensates, NCO content 30.4%, viscosity 25:80 mPas.

Chain lengthening agents
Ethanediol-(1,2)=EG
Propanediol-(1,3)=PD
Butanediol-(1,4)=14 BD
Butanediol-(1,3)=13 BD Polyols A=trifunctional polyether polyol, 83% propylene oxide, 17% ethylene oxide end groups, [Mn] about 4800 g/mol, OH number 35 mg KOH/g.

B=A filler polyether is prepared analogously to Example 1 of DE-A-263 759 which is hereby incorporated by reference, using, as "solvent", 5077 parts by weight of a polyether polyol with OH number 35 mg KOH/g prepared by the propoxylation of trimethylolpropane and ethoxylation of the propoxylation product (PO:EO ratio=83:17) but only 380 parts by weight of hydrazine hydrate are reacted instead of 670 parts by weight of hydrazine hydrate and only 1320 parts by weight of tolylene diisocyanate are reacted instead of 2310 parts by weight of the diisocyanate.

The polyether obtained has an organic filler content of 20% by weight and a hydroxyl number of 28 mg KOH/g.

C=A filler polyether is prepared, using, as "solvent", 780 parts by weight of a polyether polyol with OH number 35 mg KOH/g prepared by the propoxylation of trimethylol-propane and ethoxylation of the propoxylation product (PO:EO ratio=83:17).

A polyether having an organic filler content of 20% by weight and a hydroxyl number of 28 mg KOH/g is obtained by radical in situ polymerization of 120 parts by weight of a mixture of acrylonitrile and styrene in a ratio by weight of 60 to 40 in the polyether.

E=Trifunctional polyether polyol, 83% propylene oxide, 17% ethylene oxide end groups, [Mn] about 6000 g/mol, OH number 28 mg KOH/g.

The following Examples illustrate the improvement in compatibility of polyol mixtures by the addition of solubilizing agents at room temperature.

Example

| Diol | Mass Parts | Polyol | Mass Parts | VV | Mass Parts | Compatibility |
|---|---|---|---|---|---|---|
| 1a EG | 15 | A | 80 | DC | 3 | homogeneous |
| b EG | 15 | A | 80 | GB | 8 | homogeneous |
| c EG | 15 | A | 80 | PY | 6 | homogeneous |
| d EG | 15 | A | 80 | DP | 6 | homogeneous |
| * EG | 15 | A | 80 | — | — | inhomogeneous |
| * EG | 10 | A | 80 | — | — | inhomogeneous |
| 2 PD | 20 | A | 80 | DC | 3 | homogeneous |
| * PD | 20 | A | 80 | — | — | inhomogeneous |
| 3 13BD | 25 | A | 80 | DC | 2 | homogeneous |
| * 13BD | 25 | A | 80 | — | — | inhomogeneous |
| 4a 14BD | 25 | A | 80 | PY | 6 | homogeneous |
| b 14BD | 25 | A | 80 | TT | 10 | homogeneous |
| * 14BD | 25 | A | 80 | — | — | inhomogeneous |
| 5 EG | 15 | E | 80 | DC | 3 | homogeneous |
| * EG | 15 | E | 80 | — | — | inhomogeneous |

\* = Comparison Examples not according to the invention
VV = Enabling agents

The homogeneous solutions according to the invention remain clear for months when stored at room temperature.

The following Examples demonstrate that the improvement in stabilization against separation is also achieved with polyols containing fillers. To enable the effects to be more easily assessed, a dye is dissolved in the diol before it is mixed with the polyols.

Example

| Diol | Mass Parts | Polyol | Mass Parts | VV | Mass Parts | Compatibility |
|---|---|---|---|---|---|---|
| 6a EG | 15 | B | 100 | DC | 3 | homogeneous |
| b EG | 15 | B | 100 | PY | 6 | homogeneous |
| c 14BD | 25 | B | 100 | DP | 8 | homogeneous |
| * EG | 15 | B | 100 | — | — | inhomogeneous |
| 7 EG | 15 | C | 100 | DC | 3 | homogeneous |
| * EG | 15 | C | 100 | — | — | inhomogeneous |
| * EG | 10 | A | 80 | — | — | inhomogeneous |

\* = Comparison Examples not according to the invention

The following Examples show that the temperature above which the mixtures of short chain polyol and long chain polyol are compatible can be influenced as desired by varying the proportion of enabler.

Example

| Diol | Mass Parts | Polyol | Mass Parts | VV | Mass Parts | Compatibility |
|---|---|---|---|---|---|---|
| 8a EG | 15 | A | 80 | DC | 3 | below −6 |
| 9 EG | 15 | A | 80 | DC | 1.5 | about 100 |
| 10 EG | 15 | A | 80 | GB | 6 | about 35 |
| * EG | 15 | A | 80 | — | — | about 130 |

\* = Comparison Examples not according to the invention

The following Examples demonstrate that polyol components which are stable against separation and achieve a high level of adhesive properties after they have been mixed with an isocyanate component can be formulated with the aid of the enabling agents according to the invention.

To test for combined tension and shear strength according to DIN 53283, bonds overlapped on one side were prepared from the synthetic resin material which was to be bonded. The thickness of the adhesive joint was 0.8 mm unless otherwise indicated, the width of the sample was 20 mm and the length of overlap was 10mm. The combined tension and shear strength is given as an average value from 5 samples. The joined parts were not subjected to a special preliminary treatment.

Example 11

Joined parts: Unsaturated glass fiber reinforced polyester resin (SMC, grey), thickness: 4 mm
Setting conditions: 30 minute 160° C. (Laboratory circulating air oven, jointing device)
Polyol mixture: 6.0 Parts by weight of zeolite paste, 10.0 parts by weight of Aerosil R 202 of Degussa Company and 0.3 parts by weight of Cat. 1 are added to 98.0 parts by weight of the polyol mixture from Example 1a.
114.3 Parts by weight of the above polyol mixture are mixed with 94.0 parts by weight of crude MDI.
The average combined tension and shear strength at room temperature was 7.1 N/mm². The fracture showed complete failure of the joint.

Example 12

Joined parts: Unsaturated glass fiber reinforced polyester resin (SMC, grey), thickness: 4 mm
Setting conditions: 30 min at 160° C. (Laboratory circulating air oven, jointing device)
Polyol mixture
100.0 parts by weight of polyol C
10.0 parts by weight of EG
2.0 parts by weight of DC
2.5 parts by weight of $H_{12}$ MDA
6.0 parts by weight of zeolite paste
0.2 parts by weight of Cat. 1
120.7 Parts by weight of the above polyol mixture are mixed with 70.0 parts by weight of crude MDI.
The average combined tension and shear strength at room temperature was 6.9 N/mm². The fracture showed complete failure of the joint.

Example 13

Joined parts: Unsaturated glass fiber reinforced polyester resin (SMC, grey), thickness: 4 mm
Setting conditions: 30 min at 160° C. (laboratory circulating air oven, jointing device)
Polyol mixture
80.0 parts by weight of polyol A
10.0 parts by weight of EG
2.0 parts by weight of DC
1.5 parts by weight of IPDA
6.0 parts by weight of zeolite paste
0.1 part by weight of Cat. 2
99.6 Parts by weight of the above polyol mixture are mixed with 70.0 parts by weight of crude MDI.
The average combined tension and shear strength at room temperature was 7.4 N/mm². The fracture showed complete failure of the joint.

Example 14

Joined parts: Degreased ST 1303 steel sheet,
Thickness: 1 mm
Setting conditions: 40 min at 180° C. (laboratory circulating air oven, jointing device)
Polyol mixture
100.0 parts by weight of polyol C
17.4 parts by weight of EG
3.0 parts by weight of DC
2.5 parts by weight of $H_{12}$ MDA
6.0 parts by weight of zeolite paste
0.1 part by weight of Cat. 1

129.0 parts by weight of the above polyol mixture are mixed with 100.0 parts by weight of crude MDI.

The average combined tension and shear strength at room temperature was above 17.5 N/mm². The appearance of the fracture indicated a mixed break between failure of adhesion and failure of cohesion.

This Example confirms that higher combined tension and shear strengths can be obtained, depending on the substrate.

Joined parts: A polycarbonate-ABS blend containing 65% of polycarbonate.

Setting conditions: 24 h at room temperature (jointing device)

Polyol mixture
100.0 parts by weight of Polyol B
10.0 parts by weight of EG
2.0 parts by weight of DC
2.5 parts by weight of $H_{12}$ MDA
6.0 parts by weight of zeolite paste
0.2 parts by weight of Cat. 1

20.7 parts by weight of the above polyol mixture are mixed with 70.0 parts by weight of crude MDI.

The average combined tension and shear strength at room temperature was 6.9 N/mm². The fracture showed complete failure of the joint.

Example 16

Joined parts: Unsaturated glass fiber reinforced polyester resin (SMC 109), thickness: 4 mm Setting conditions: 30 min at 160° C. (laboratory circulating air oven, jointing device)

Polyol mixture
80.0 parts by weight of polyol A,
12.0 parts by weight of EG
2.5 parts by weight of DC
2.0 parts by weight of IPDA
6.0 parts by weight of zeolite paste
0.1 part by weight of cat. 1

02.6 Parts by weight of the above polyol mixture are mixed with 70.0 parts by weight of crude MDI.

The average combined tension and shear strength at 40° C. was 9.4 N/mm². The fracture showed complete failure of the joint.

Example 17

Joined parts: Unsaturated glass fiber reinforced polyester resin (SMC), starch: 4 mm Setting conditions: 30 min at 160° C. (laboratory circulating air, jointing device)

Polyol mixture: 98.0 parts by weight of the polyol mixture from Example 1c are mixed with 2.5 parts by weight of $H_{12}$-MDA, 6.0 parts by weight of zeolite paste and 0.1 part by weight of Cat. 1.

106.6 Parts by weight of the above polyol mixture are mixed with 94.0 parts by weight of crude MDI.

The average combined tension and shear strength at room temperature was 4.2 N/mm². The fracture showed complete failure of the joint.

Example 18

Joined parts: Unsaturated glass fiber reinforced polyester resin (SMC), thickness: 4 mm Setting conditions: 30 min at 160° C. (laboratory circulating air oven, jointing device)

Polyol mixture: 101.0 parts by weight of the polyol mixture from Example 1e are mixed with 2.5 parts by weight of $H_{12}$ MDA, 10.0 parts by weight of zeolite paste and 0.1 part by weight of Cat.1.

113.6 Parts by weight of the above polyol mixture are mixed with 94.0 parts by weight of crude MDI.

The average combined tension and shear strength at room temperature was 6.3 N/mm². The fracture showed complete failure of the joint.

Example 19

Joined parts: Unsaturated glass fiber reinforced polyester resin (SMC), thickness: 4 mm Setting conditions: 30 min at 160° C. (laboratory circulating air oven, jointing device)

Polyol mixture
100.0 parts by weight of polyol B
17.4 parts by weight of EG
6.0 parts by weight of DC
2.5 parts by weight of $H_{12}$MDA
6.0 parts by weight of zeolite paste
0.1 part by weight of Cat. 1

132.0 Parts by weight of the above polyol mixture are mixed with 100.0 parts by weight of crude MDI.

The average combined tension and shear strength at room temperature was 6.4 N/mm². The fracture showed complete failure of the joint.

Example 20

Joined parts: Unsaturated glass fiber reinforced polyester resin (SMC), thickness: 4 mm Setting conditions: 30 min at 160° C. (laboratory circulating air oven, jointing device)

Polyol mixture
100.0 parts by weight of-polyol B
25.0 parts by weight of 14 BD
8.0 parts by weight of BT
2.5 parts by weight of $H_{12}$ MDA
6.0 parts by weight of zeolite paste
0.1 part by weight of Cat. 1

141.6 Parts by weight of the above polyol mixture are mixed with 100.0 parts by weight of crude MDI.

The average combined tension and shear strength at room temperature was 7.8 N/mm². The fracture showed complete failure of the joint.

Example 21

Joined parts: Unsaturated glass fiber reinforced polyester resin (SMC), thickness: 4 mm Setting conditions: 30 min at 160° C. (Laboratory circulating air oven, jointing device)

Polyol mixture
80.0 parts by weight of polyol A
25.0 parts by weight of 14 BD
8.0 parts by weight of BT
2.5 parts by weight of $H_{12}$-MDA
6.0 parts by weight of zeolite paste
0.1 part by weight of Cat. 1

121.6 Parts by weight of the above polyol mixture are mixed with 100.0 parts by weight of crude MDI.

The average combined tension and shear strength at room temperature was 5.9 N/mm². The fracture showed complete failure of the joint.

Example 22

This example shows the possibility of formulating a typical polyol mixture which shows no change in its hardening characteristics over a storage period of 24 days. No change in catalytic activity occurs within the accuracy of measurement.

Polyol mixture
100.0 parts by weight of polyol B 25.0 parts by weight of 14 BD
6.0 parts by weight of PY
2.5 parts by weight of $H_{12}$ MDA
6.0 parts by weight of zeolite paste
0.2 parts by weight of Cat. 1

The polyol mixture is mixed with 100.0 parts of crude MDI for one minute with substantial exclusion of air and atmospheric moisture. About 18 g of the mixture are then introduced into a cylindrical polyethylene vessel and then immediately measured at room temperature with the aid of "Vibrating Needle Curemeter" of Rapra Ltd. without further tempering.

The polyol mixture is stored in screw topped glass jars at room temperature.

The following curing times are obtained:
after 2 days' storage: 1st value, 3 min 5 sec 2nd value 3 min 0 sec
after 24 days' storage: 1st value, 3 min 0 sec 2nd value, 3 min 3 sec.

What is claimed is:

1. A two-component polyurethane reactive composition containing an isocyanate component a.), a component b.) containing:
   b1.) 100 parts by weight of a hydroxyl group-containing compound having a molecular weight of at least 400 and a funtionality of at least 2,
   b2.) from 5–35 parts by weight of a hydroxyl group containing chain low molecular weight chain lengthening agent having a molecular weight of from 62–400 and a functionality of at least 2,
   b3.) from 0.5–10 parts by weight of at least one compound which stabilizes against separation selected from the group consisting of dicyandiamide, guanidine, derivatives of guanidine containing at least one N—H bond, and compounds having a N—H group or $NH_2$ group and a C—N multiple bond or N—N multiple bond in which the nitrogen atom of the C—N group or a nitrogen atom of the N—N group is directly attached to the nitrogen atom of the N—H or $NH_2$ group,
   b4.) from 0–20 parts by weight of at least one aliphatic, aromatic, or cycloaliphatic diamine or triamine having a molecular weight of at least 60,
   b5.) optionally a catalyst for the reaction of a) with b), and
   b6.) optionally auxiliary agents and additives.

2. The two-component polyurethane reactive composition according to claim 1 characterized in that the compound stabilizing against separation is dicyandiamide.

3. The two-component polyurethane reactive composition according to claim 1 characterized in the compound stabilizing against separation is pyrazole, tolyl triazole, benzotriazole or 3,5-dimethylpyrazole.

4. An adhesive composition comprising the two-component polyurethane reactive composition according to claim 1.

5. A process for bonding substrates comprising applying an adhesive containing the two-component polyurethane reactive composition of claim 1 to a surface of one of the substrates and contacting said surface with a surface of another substrate to which is optionally applied the adhesive composition.

* * * * *